United States Patent [19]
Tachibana et al.

[11] Patent Number: 5,540,988
[45] Date of Patent: Jul. 30, 1996

[54] MAGNETO-OPTICAL RECORDING MEDIUM AND PROCESS FOR PRODUCING THE SAME

[75] Inventors: Shinichi Tachibana, Machida; Hiroshi Yoshida; Katsuhiko Takano, both of Yokohama, all of Japan

[73] Assignee: Canon Kabushiki Kaisha, Tokyo, Japan

[21] Appl. No.: 61,318

[22] Filed: May 14, 1993

[30] Foreign Application Priority Data

May 19, 1992 [JP] Japan .................. 4-125873
Oct. 15, 1992 [JP] Japan .................. 4-301644
Apr. 16, 1993 [JP] Japan .................. 5-089865

[51] Int. Cl.⁶ .................. B32B 5/16; G11B 5/66; B05D 5/12
[52] U.S. Cl. .................. 428/323; 428/325; 428/327; 428/332; 428/336; 428/694 ML; 428/694 DE; 428/694 PR; 428/694 XS; 428/900; 427/127; 427/128; 427/130; 427/131; 156/272.4
[58] Field of Search .................. 428/694 ML, 694 DE, 428/694 PR, 694 XS, 323, 325, 327, 332, 336, 900; 427/127, 128, 130, 131; 156/272.4

[56] References Cited

U.S. PATENT DOCUMENTS

| | | | |
|---|---|---|---|
| 4,618,537 | 10/1986 | Takano et al. | 428/336 |
| 4,710,418 | 12/1987 | Takano et al. | 428/192 |
| 4,737,408 | 4/1988 | Kuwahara | 428/335 |
| 4,777,068 | 10/1988 | Omata et al. | 428/69 |
| 4,923,766 | 5/1990 | Hosoi et al. | 428/694 B |
| 5,079,096 | 1/1992 | Miyoke | 428/500 |
| 5,102,709 | 4/1992 | Tachibana et al. | 428/64.4 |

FOREIGN PATENT DOCUMENTS 0464939 2/1992 Japan .

*Primary Examiner*—Leszek Kiliman
*Attorney, Agent, or Firm*—Fitzpatrick, Cella, Harper & Scinto

[57] ABSTRACT

A magneto-optical recording medium comprises a substrate and provided thereon a magneto-optical recording layer and a protective resin layer, a magnetic field being applied to the magneto-optical recording layer from the side of the protective layer by a magnetic-field generating means, and the recording layer being irradiated with a light beam through the substrate to record information. The protective layer has a first surface confronting the magnetic-field generating means and a second surface confronting the recording layer, and the protective layer has a surface resistivity of $1\times10^{10}$ Ω/□ or less on the first surface and has a region with a thermal conductivity of 10 W/m·K or less, extending from the second surface toward the first surface.

18 Claims, 5 Drawing Sheets

MAGNETO-OPTICAL RECORDING MEDIUM AND PROCESS FOR PRODUCING THE SAME

BACKGROUND OF THE INVENTION

1. Field of the Invention

The present invention relates to a magneto-optical recording medium in and from which information can be recorded, reproduced and erased by utilizing light beams, and a process for producing it.

2. Related Background Art

In recent years, as large-capacity information recording means, optical memories such as optical disks are energetically developed and marketed. In particular, information-erasable/rewritable magneto-optical recording mediums have attracted notice.

Conventional magneto-optical recording mediums, however, require two steps when recorded information is rewritten, which are the steps of erasing recorded old information and thereafter recording new information, and have had a problem in making the data transfer speed higher. To cope with such a problem, proposals are made on a magnetic-field modulation system that requires no erasure of old information when information is rewritten, i.e., a system in which, while a magneto-optical recording medium is irradiated with laser beams having a constant intensity, a magnetic field applied is modulated according to information signals to make a record.

Incidentally, when the above magnetic-field modulation system is employed in the recording of information in magneto-optical disks, a magnetic head must be made to have a low inductance in order to increase switching speed in the direction of external magnetic field to improve the transfer speed. This, however, is accompanied with a lowering of magnetic field sensitivity, and hence it is preferable for the magnetic head to be made as close as possible to a magneto-optical recording layer (see FIG. 8).

In such a case, however, since the magnetic head is rubbed against a protective layer provided on the magneto-optical recording layer when stopped, there has been the problem that the magnetic head and the protective layer cause electrostatic attraction between them to make it difficult to drive the magnetic head and the magneto-optical disk.

Thus, as a countermeasure to such a problem, the present applicants have proposed in Japanese Patent Application Laid-open No. 4-64939 to disperse a conductive inorganic filler such as tin oxide in the protective layer so that the surface electric resistance of the protective layer is decreased to prevent electrostatic attraction between the magnetic head and the protective layer.

Such constitution is effective for preventing the electrostatic attraction between the magnetic head and the protective layer, but tends to result in a lowering of recording sensitivity of the magneto-optical disk, also making the shape of recording pits non-uniform to bring about the problem of a decrease in C/N ratio of reproducing signals of recorded information.

SUMMARY OF THE INVENTION

The present invention was made taking account of the above problems. An object thereof is to provide a magneto-optical recording medium that can prevent electrostatic attraction between the magnetic head and the protective layer and at the same time can prevent decrease in recording sensitivity and lowering of C/N ratio.

Another object of the present invention is to provide a process for producing a magneto-optical recording medium that can prevent electrostatic attraction between the magnetic head and the protective layer and also may cause very small lowering of recording sensitivity and decrease in C/N ratio.

To achieve such objects, the present inventors made studies on the above problems. As a result, they have discovered that the lowering of recording sensitivity and the decrease in C/N ratio are due to a non-uniform temperature diffusion in the protective layer, caused by a high thermal conductivity of the inorganic filler dispersed in the protective layer for imparting conductivity, and thus have accomplished the present invention.

The magneto-optical recording medium of the present invention is a magneto-optical recording medium comprising a substrate and provided thereon a magneto-optical recording layer and a protective resin layer, a magnetic field being applied to said magneto-optical recording layer from the side of said protective layer by a magnetic-field generating means, and said recording layer being irradiated with a light beam through said substrate to record information; wherein said protective layer has a first surface confronting said magnetic-field generating means and a second surface confronting said recording layer, and said protective layer has a surface resistivity of $1\times10^{10}$ $\Omega$/square($\square$) or less on the first surface and has a region with a thermal conductivity of 10 W/m·K or less, extending from the second surface toward the first surface.

As another embodiment, the magneto-optical recording medium of the present invention is a magneto-optical recording medium comprising a substrate and provided thereon a magneto-optical recording layer and a protective resin layer, a magnetic field being applied to said magneto-optical recording layer from the side of said protective layer by a magnetic-field generating means, and said recording layer being irradiated with a light beam through said substrate to record information; wherein said protective resin layer has a laminated structure comprised of at least two layers, a first protective layer of the laminated protective layer, nearest to said magneto-optical recording layer, is formed of a material having a thermal conductivity of 10 W/m·K or less, and a protective layer nearer to the magnetic-field generating means than said first protective layer contains acicular or flaky conductive particles having an aspect ratio of 5 or more, thereby being so formed that said magneto-optical recording medium has a surface resistivity of $1\times10^{10}$ $\Omega$/square or less on its surface confronting said magnetic-field generating means.

As still another embodiment, the magneto-optical recording medium of the present invention is a magneto-optical recording medium comprising a substrate and provided thereon a magneto-optical recording layer and a protective resin layer, a magnetic field being applied to said magneto-optical recording layer from the side of said protective layer by a magnetic-field generating means, and said recording layer being irradiated with a light beam through said substrate to record information; wherein said protective layer contains acicular or flaky conductive particles having an aspect ratio of 5 or more, thereby being so formed that said magneto-optical recording medium has a surface resistivity of $1\times10^{10}$ $\Omega$/square or less on its surface confronting said magnetic-field generating means.

The process for producing a magneto-optical recording medium of the present invention is a process for producing a magneto-optical recording medium comprising a substrate and provided thereon with a magneto-optical recording layer and a protective resin layer, a magnetic field being applied to said magneto-optical recording layer from the side of said protective layer by a magnetic-field generating means, and said recording layer being irradiated with a light beam through said substrate to record information; wherein the process comprises the step of bonding a resin sheet having a surface resistivity of $1\times10^{10}$ Ω/square or less on its at least one surface, onto said magneto-optical recording layer, with an adhesive layer having a thermal conductivity of 10 W/m·K or less being interposed therebetween, in the manner that said surface confronts said magnetic-field generating means, thereby forming said protective resin layer on said magneto-optical recording layer.

According to the present invention, the region having a thermal conductivity of 10 W/m·K or less, provided in the protective resin layer on its side of the magneto-optical recording layer, serves as a thermal barrier, which can moderate an increase in the rate of temperature diffusion accompanied with the impartment of conductivity to the protective resin layer or moderate the influence of the non-uniform rate of temperature diffusion on the recording and reproducing of information.

DESCRIPTION OF THE PREFERRED EMBODIMENTS

The present invention will be described in detail with reference to the accompanying drawings.

Figure 1:
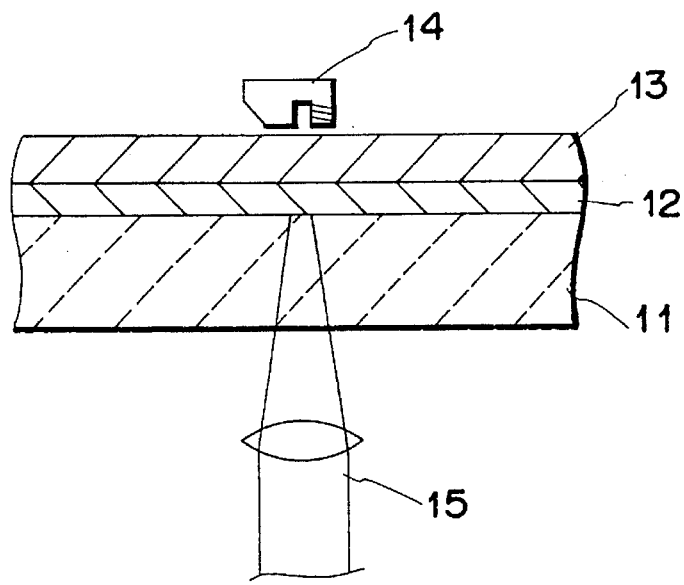
FIG. 1 is a schematic illustration of the manner by which information is recorded in an optical disk of the present invention.

The present invention is concerned with a magneto-optical recording medium comprising, for example, as shown in FIG. 1, a substrate 11 and provided thereon a magneto-optical recording layer 12 and a protective layer 13 in this order, and used in a system in which a magnetic field is applied to the recording layer from the side of the protective layer by a magnetic-field generating means 14 and the recording layer is irradiated with a light beam 15 through the substrate to record information. As the protective layer, its surface confronting the magnetic-field generating means is herein called a first surface and its surface confronting the recording layer a second surface, where the protective layer has a surface resistivity of $1\times10^{10}$ Ω/square or less on the first surface and has a region with a thermal conductivity of 10 W/m·K or less, extending from the second surface toward the first surface. This constitution makes it possible to prevent electrostatic attraction between the magnetic head and the protective layer and at the same time prevent decrease in recording sensitivity and lowering of C/N ratio.

Figure 2:
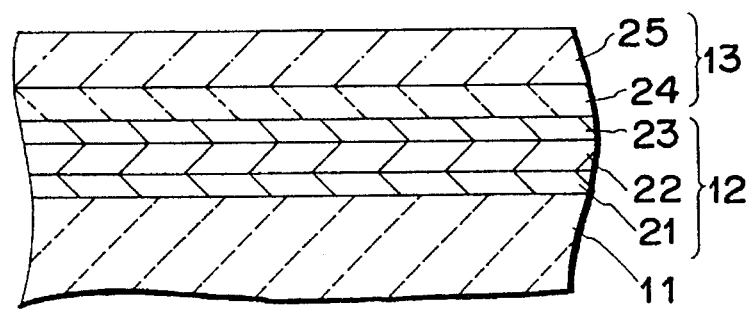
FIG. 2 is a schematic partial cross section of an embodiment of the magneto-optical disk of the present invention.

As another embodiment, FIG. 2 is a schematic partial illustration of an embodiment of the magneto-optical recording medium of the present invention, which comprises a substrate 11, a laminated film formed thereon, comprised of an inorganic dielectric layer 21, a magnetic material layer 22 and an inorganic dielectric layer 23 which serve as a magneto-optical recording layer 12, and a laminated film also formed on the magneto-optical recording layer 12, comprised of a first protective layer 24 and a second protective layer 25 which serve as a protective resin layer 13. The second protective layer is formed of a resin composition containing conductive particles, thereby being so formed that the second protective layer has a surface resistivity of $1\times10^{10}$ Ω/square or less on its surface confronting a magnetic head 14 (the magnetic-field generating means). The first protective layer is formed of a resin composition having a thermal conductivity of 10 W/m·K or less.

In this embodiment, as the conductive particles contained in the second protective layer, either inorganic particles or organic particles can be used so long as they can control the second protective layer to have a specific volume resistance of the stated value on its surface confronting the magnetic head. As the inorganic particles, it is possible to use, for example, particles of metals such as Cu, Ni and Al, or conductive ceramic particles, stated specifically, ceramic particles comprised of ceramic such as TiO, $TiO_2$, ZnO, $K_2O \cdot TiO_2$ or $9Al_2O_3 \cdot 2B_2O_3$ having been doped with a different kind of element such as Sb or Al followed by reductive firing, or having been coated with a conductive material as exemplified by Al, Ni or Sb on their particle surfaces to make the particles conductive. Those making use of ceramic particles containing Ti, among the foregoing conductive ceramic particles, are preferable since they can impart excellent conductivity to the protective layer and also can minimize any changes with time in the conductivity of the protective layer.

In the present invention, it is preferable to use the above conductive ceramic particles as the inorganic particles. More specifically, this is because the conductive ceramic particles have a smaller specific gravity than metal particles, and hence can be well dispersed in the second protective layer and may less cause the second protective layer to undergo the undesirable uneven temperature diffusion. However, when inorganic particles are used, because of the thermal conductivity of inorganic particles that is larger than that of organic particles, the first protective layer may preferably be formed in a layer thickness of 1 μm or more, particularly 1.5 μm or more, and more preferably 2 μm or more so that a barrier effect attributable to the first protective layer against the conduction of heat from the magneto-optical recording layer to the second protective layer can be more improved.

In the case when the inorganic particles are used, the second protective layer may be made to have, on its surface confronting the magnetic head, a surface resistivity within the range of from $1\times10^3$ to $1\times10^{10}$ Ω/square, in particular, from $1\times10^7$ to $1\times10^{10}$ Ω/square. This is preferable since it becomes possible to effectively prevent electrostatic attraction of the magnetic head to the second protective layer and also to prevent the increase in the rate of temperature diffusion in the second protective layer, which may cause a decrease in sensitivity and a lowering of C/N ratio of the magneto-optical recording medium.

The inorganic particles may be contained in the second protective layer in an amount that may make the second protective layer have a surface resistivity of $1\times10^{10}$ Ω/square or less, preferably in an amount of not more than 40% by weight, particularly not more than 20% by weight, and more preferably not more than 15% by weight. Addition of the inorganic filler to the protective layer in the amount within the above range makes it possible to avoid the problems wherein the strength of the protective layer may be lowered so as to cause scratches in the protective layer during its touch with the magnetic head and wherein the filler may agglomerate so as to lead to formation of protuberances comprised of agglomerates of the filler, on the surface of the protective layer.

The inorganic particles may have an average particle diameter of from 0.1 to 5 μm, and particularly from 0.5 to 3 μm. This is preferable since such particles may cause no agglomeration in the second protective layer to bring about no uneven temperature diffusion in the second protective layer.

In this instance, where the above conductive ceramic particles are used as the conductive particles, it is preferable to use acicular or flaky particles having an aspect ratio of 5 or more, and particularly 10 or more and 50 or less.

The aspect ratio is what is expressed by b/a which is the ratio of a length b of a particle in its longitudinal direction to a length a thereof in its lateral direction.

More specifically, use of the acicular or flaky conductive ceramic particles having an aspect ratio of 5 or more makes it possible to impart a high conductivity even when they are added in the second protective layer in a smaller amount of, e.g., not more than 15% by weight, so that it is possible to prevent the increase in the rate of temperature diffusion in the second protective layer, which may cause a decrease in recording sensitivity and a lowering of C/N ratio of the magneto-optical recording medium, and to make the layer thickness of the first protective layer smaller than the case in which metal particles or usual conductive ceramic particles are used. Hence, it becomes possible to make the layer thickness of the whole protective resin layer 13 smaller and make the magnetic head 14 and the magneto-optical recording layer 12 stand closer. Since the amount of the particles added to the second protective layer can be decreased, it is also possible to prevent mechanical strength such as head crash resistance of the second protective layer from being lowered.

It is still also possible to prevent agglomeration of particles. When the above acicular or flaky particles are used, the particles may have an average length, in their longitudinal direction, of from 0.5 to 5 μm, and particularly from 1 to 4 μm, which can be preferably used when their dispersibility is taken into account.

As for the organic conductive particles in the present embodiment, particles comprised of a conductive polymeric compound or a charge transfer complex can be used. As the conductive polymeric compound, for example, polymers having a heterocyclic ring of a thiophene, furan or pyrrole type as a monomer unit and polymers having a paraphenylene or a derivative thereof as a monomer unit, as well as conductive polymers comprised of polypyrrole and a polyanion that have been compounded on the molecular order can be used. As the charge transfer complex, for example, an anthracene compound represented by the following formula (I) is preferably used, which has a small change in electrical resistance even in an environment of high temperature and high humidity and also has a good dispersibility in resin compositions.

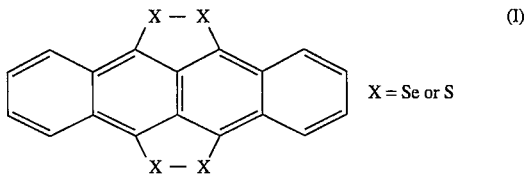

In the present embodiment, the organic conductive particles such as the conductive polymeric compound and the charge transfer complex as described above are preferable since their addition causes little change in the rate of temperature diffusion in the second protective layer. The organic conductive particles may be added in such an amount that the second protective layer may have a surface resistivity of $1\times10^{10}$ Ω/square or less on its surface confronting the magnetic head. When no desired conductivity can be imparted to the second protective layer by the addition of the organic conductive particles alone, the inorganic conductive particles previously described may be used in combination. In such an instance, the inorganic particles may preferably be added in an amount as small as possible so that the rate of temperature diffusion in the second protective layer can be prevented from increasing. It is unnecessary to add the inorganic particles when the stated surface resistivity can be achieved by the addition of the organic conductive particles alone.

In the second protective layer in the present embodiment, as a resin component serving as a matrix of the inorganic conductive particles and/or organic conductive particles, polyethylene, polyethylene terephthalate, polypropylene, polybutylene terephthalate or natural resins can be used. In particular, what can be preferably used are cross-linked polymeric compounds capable of forming a resin layer having a good wear resistance during its sliding touch with the magnetic head, polymeric compounds capable of providing a resin layer having a low moisture permeability, stated specifically, a moisture permeability of 100 g/m$^2$·24 hr or less according to what is prescribed in JIS-Z-0208, and also polymers capable of imparting a wettable surface to the resin layer.

As the cross-linked polymeric compound, those cross-linked by heat or radiations (light, electron rays, etc.) are used. In particular, because of excellent productivity, photocurable resins are preferably used. As the photocurable resins, for example, those obtained by polymerizing an acrylate resin composition that can effectively prevent permeation of oxygen or moisture into the magneto-optical recording layer, as exemplified by ultraviolet-curable acrylate resin compositions usually comprised of a mixture composition of (A) a prepolymer component, (B) a reactive diluent component and (C) a photopolymerization initiator component. The component (A) may include, for example, polyolpolyacrylates, polyester-acrylates, urethane-acrylates and epoxy-acrylates. As the component (B), acrylates of polyhydric alcohols are used. As the component (C), any known photopolymerization initiators can be used, and preferably those having a good storage stability after compounding. They may include, for example, benzoine alkyl ethers, acetophenones, propiophenones, anthraquinones and thioxanthones. Any of these are used alone, or in combination of two or more kinds mixed in any desired proportion.

The polymeric compounds capable of providing a resin layer having a moisture resistance may include, for example, polyvinyl chloride, polyvinylidene chloride and a vinyl chloride/vinylidene chloride copolymer. In particular, polyvinyl chloride and a vinyl chloride/vinylidene chloride copolymer are preferable because of their particularly small moisture permeability. Examples are by no means limited to the above compositions so long as they have a moisture permeability equal to or smaller than that of the above compositions.

As the polymeric compounds capable of providing a wettable resin layer, those obtained by polymerizing wettable monomers such as fluorinated acrylates and silicified acrylates are preferably used. Of the wettable monomers, ultraviolet-curable resin compositions having an acrylic group or mathacrylic group are preferably used. A fluorinated acrylate oligomer or silicified acrylate oligomer (weight average molecular weight: 200 to 5,000) may also be blended in ultraviolet-curable resin compositions such as urethane-acrylates, epoxy-acrylates, polyester-acrylates and polyether-acrylates in an amount of from 5 to 20% by weight based on the ultraviolet-curable resin. Fluorinated polymers are also preferably utilized. A liquid fluorine type wetting agent may be blended in the ultraviolet-curable resin compositions. Resin compositions obtained by blending 2 to 30% by weight, and preferably 5 to 20% by weight, of a wettable filler in a radiation-curable resin composition, curable by electron rays, light, etc. are also preferably used.

The wettable filler may include inorganic fillers such as graphite, molybdenum disulfide and hexagonal BN (boron nitride), and organic fillers such as silicone resin and fluorine resins. The wettable filler may preferably have a particle diameter of from 0.1 to 20 µm, and particularly preferably from 0.5 to 5 µm.

In the present embodiment, as resins used in the first protective layer, the resins described above can be used so long as the first protective layer can have a thermal conductivity of 10 W/m·K or less, preferably 5 W/m·K or less, and particularly preferably 1 W/m·K or less. For example, the curable polymeric compounds described above are preferably used.

In the present embodiment, the first protective layer may preferably have such a thickness that it can function as a heat-insulating layer that may cause no deterioration of the performance of recording and reproducing information in and from the magneto-optical recording layer, because of thermal properties of the conductive particles added to the second protective layer. For example, it may have a thickness of 0.5 µm or more, particularly 1.0 µm or more, and more preferably 2 µm or more. Such a thickness can more ensure the function of the first protective layer as the heat-insulating layer.

The protective resin layers of the magneto-optical recording medium according to the present embodiment can be formed in the following way: when the first protective layer and the second protective layer are formed from liquid resin compositions or liquid resin precursors, a first protective layer material is applied on the magneto-optical recording layer 12 by a known film forming process such as spin coating or dipping, and the coating thus formed is dried to solidify or is cured by a given process as exemplified by irradiation with light, or, without such solidification or curing, a second protective layer material containing the conductive particles is applied to form a film, using the above film forming process, followed by solidification or curing of the second protective layer or the first and second protective layers.

Alternatively, the second protective layer may be previously formed into a sheet and the first protective layer may be allowed to function as an adhesive layer, where the second protective layer is bonded onto the magneto-optical recording layer 12 interposing the first protective layer between them.

This method can solve the problem wherein the process of solidifying or curing a coating of the protective layer on the magneto-optical recording layer may cause a stress applied to the substrate because of a shrinkage accompanied with the solidification or curing of the coating, consequently tending to warp the magneto-optical recording medium. In the case when the protective layer is formed by wet coating, the protective layer may have a difference in thickness because of uneven coating, but this method, making use of the resin layer having been formed into a sheet, can avoid such a problem. Thus, this method is a preferred method.

Moreover, the resin sheet, even with a relatively small layer thickness (e.g., 2 µm), can be easily and uniformly formed, and hence this method is also suited for providing a thiner protective layer that is preferable for making the magnetic head and the magneto-optical recording layer stand closer.

In the case when the first protective layer is made to function as an adhesive layer for bonding the sheet type second protective layer onto the magneto-optical recording layer, the first protective layer may be formed of a material including the resin compositions described above, and besides materials commonly used as adhesives or pressure-sensitive adhesives as exemplified by adhesive resins comprising acrylic resin, acrylate or maleic acid as main component monomers, stated specifically, an ethylene/acrylic acid copolymer, an ethylene/acrylate copolymer, an ethylene/methacrylic acid copolymer, an ethylene/methacrylate copolymer, an ethylene/methyl methacrylate copolymer, an ethylene/ethyl acrylate copolymer, etc., and rubber type adhesives or pressure-sensitive adhesives. Those having a thermal conductivity of 10 W/m·K or less can be preferably used. Here, the rubber type adhesives or pressure-sensitive adhesives may include, for example, those having a rubber component having a diene bond as a rubber component and capable of retaining a tack in the presence of a tackifier (tackiness-providing agent) component. Such a rubber component may include, for example, block type thermoplastic elastomers. When in the magneto-optical recording medium according to the present embodiment the first protective layer is formed of the adhesive comprising the block type thermoplastic elastomer, the elastic behavior of the adhesive can moderate with time the internal stress of the magneto-optical recording medium, and the magneto-optical recording layer can be prevented from separating from the substrate even in, for example, an environment of high temperature and high humidity. Thus its use is preferred.

Here, the block type thermoplastic elastomers are exemplified by one or an intimate mixture of two or more kinds of block type thermoplastic elastomers represented by A-B, A-B-A or B-A-B (wherein A represents a polystyrene polymer block, and B, a polymer block comprised of polybutadiene, polyisoprene or an ethylene/butylene copolymer), and also any of these to which other synthetic rubber, polyolefin or a polyolefin copolymer has been further added.

The tackifier component used here may include rosin resins, terpene resins and those comprised of petroleum resins of an aliphatic type, an alicyclic type and an aromatic type. The liquid pressure-sensitive adhesive composition can be cured by applying a method in which a conventionally known radical polymerization initiator is blended in the composition followed by heating, a method in which a photopolymerization initiator is blended in the composition followed by exposure to UV rays, or a method in which the composition is exposed to electron rays.

Figure 4A:
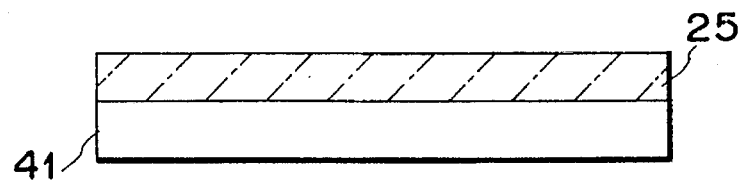
FIGS. 4A to 4C illustrate a process for preparing a protective adhesive sheet according to the present invention.

In the present embodiment, when the resin sheet having been formed into a sheet is used as the second protective layer and the protective resin layer making use of a pressure-sensitive adhesive layer as the first protective layer is formed, a protective pressure-sensitive sheet comprised of the second protective layer and the first protective layer in an integral form may be previously formed in the manner as described below. This enables very easy formation of the protective resin layer on the magneto-optical recording layer. That is, as shown in FIG. 4A, on a first support film 41 such as a polyester film, for example, a material for the second protective layer is applied in a given thickness by a given method, and the coating thus formed is cured by heating or by exposure to ultraviolet rays, electron rays or the like to form the second protective layer 25.

Figure 4B:
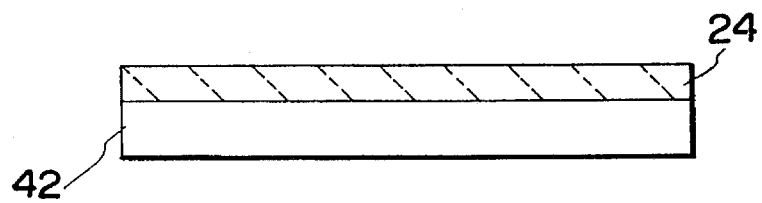
Figure 4C:
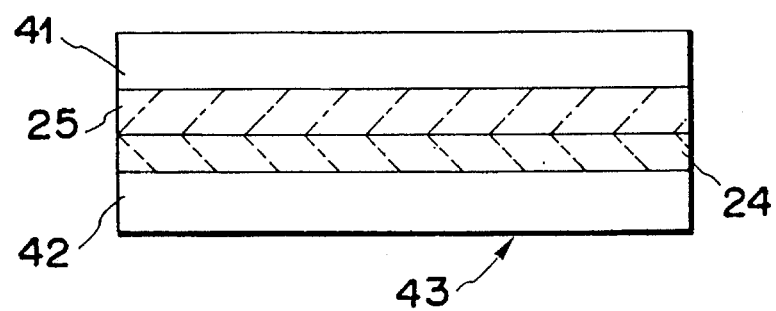

In the meantime, as shown in FIG. 4B, on a second support film 42, a pressure-sensitive adhesive layer 24 serving as the first protective layer is formed, and then the first support film and the second support film are laminated in the manner that the second protective layer 25 and the pressure-sensitive adhesive layer 24 stand face-to-face, as shown in FIG. 4C. Thus a protective pressure-sensitive adhesive sheet 43 is prepared.

Figure 5A:
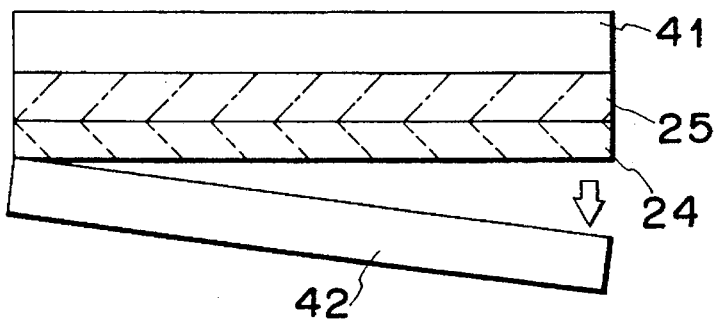
FIGS. 5A to 5C illustrate a process for producing the magneto-optical recording medium according to the present invention.
Figure 5B:
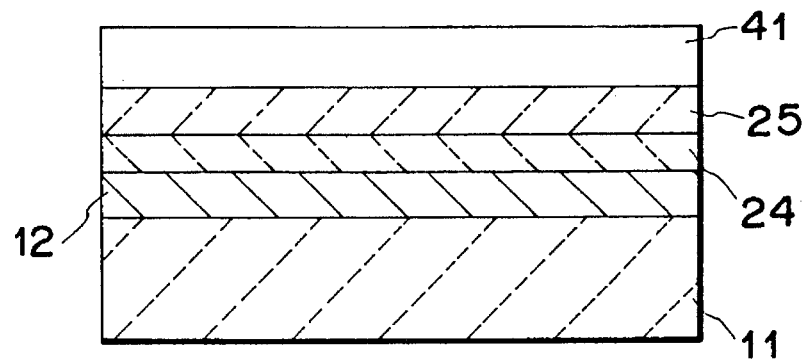
Figure 5C:
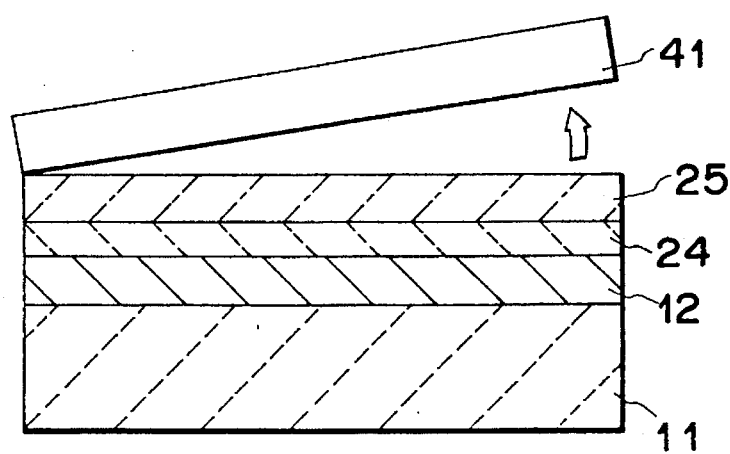

Then, using this protective pressure-sensitive adhesive sheet 43, the protective resin layer is formed on the magneto-optical recording layer by, as shown in FIG. 5A, first peeling the second support film 42 from the protective pressure-sensitive adhesive sheet, thereafter sticking it on the magneto-optical recording layer 12 (FIG. 5B), and finally the first support film 41 is peeled away (FIG. 5C). A process of forming the protective layer is thus completed.

which the second protective layer is made up using the conductive polymeric compound previously described or a polymer in which a charge transfer complex has been dispersed. In particular, a preferable material as a material for this second protective layer is a polymer obtained by forming a polypyrrole represented by the following formula (II) and a phenoxy resin type polyanion represented by the following formula (III) into a compound material as shown by the following formula (IV), or a polymer obtained by dispersing 0.3 to 2% by weight, and particularly 1 to 1.5% by weight, of the tetracene compound represented by formula (I) previously described, in a polymer such as polycarbonate resin.

In the case when the polymer in which the conductive polymeric compound or charge transfer complex has been dispersed is used as a material for the second protective layer, a solution of the resin precursor (a prepolymer or the like) that constitutes the second protective layer or a solution of the polymer may be applied on the magneto-optical recording layer by spin coating or dipping to form a film, followed by cross-linking or drying of the solvent to form the protective layer. Alternatively, the polymer, having been formed into a sheet, may be bonded onto the magneto-optical recording layer interposing the adhesive layer described above, to form the protective layer. Still alternatively, the protective pressure-sensitive adhesive sheet may be formed using the polymer having been formed into a sheet, and the sheet is used to form the protective resin layer. In this case, the material used for the adhesive layer may preferably have a thermal conductivity of 10 W/m·K or less, but there are no particular limitations on the thickness of the adhesive layer so long as it has a thickness necessary for functioning as an adhesive layer.

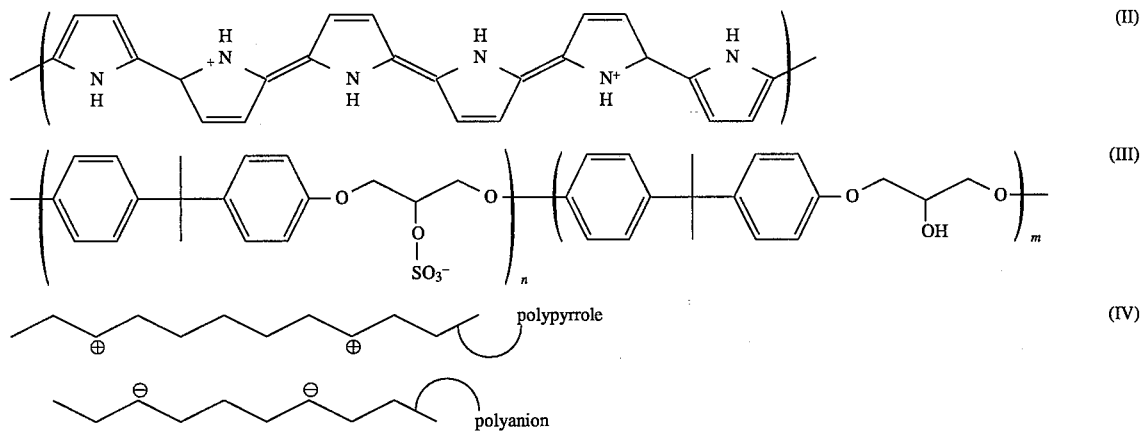

As another method for preparing the protective pressure-sensitive adhesive sheet, a pressure-sensitive adhesive layer serving as the first protective layer may be directly formed by coating on a resin sheet serving as the second protective layer, having been formed into a sheet.

Figure 3:
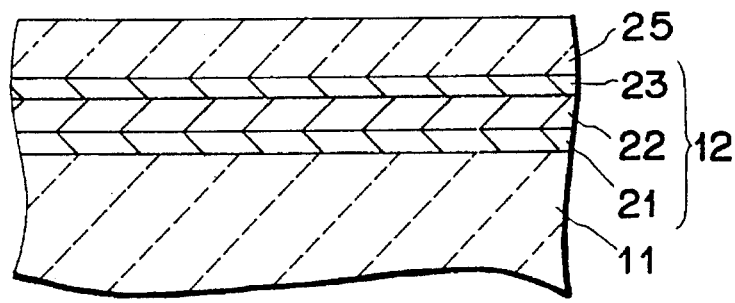
FIG. 3 is a schematic partial cross section of another embodiment of the magneto-optical disk of the present invention.

Incidentally, in the present embodiment, the first protective layer can be omitted as shown in FIG. 3, when the second protective layer has a thermal conductivity of 10 W/m·K or less and also the second protective layer has on its one surface a surface resistivity of $1 \times 10^{10}$ Ω/square or less. This enables simplification of the process of forming the protective resin layer.

The second protective layer can be endowed with the above two physical properties by, for example, a method in In the present invention, it is suitable for the protective resin layer to have a thickness in the range of from 3 to 15 μm, and preferably from 5 to 10 μm. A protective layer with a thickness less than 3 μm is not preferable from the viewpoint of preventing the surface of the recording layer from being scratched, and a protective layer with a thickness more than 15 μm results in a large distance between a magnetic head slider and the magneto-optical recording layer to make it impossible to carry out low-magnetic field recording and also to make it impossible to decrease drive power consumption.

In the constitution of the magneto-optical recording medium to which the present invention can be applied, there are no particular limitations on the constitution other than the protective resin layer 13. The present invention can be applied to all mediums having other known constitution, for example, those comprising a substrate and provided thereon a magneto-optical recording layer of laminated structure comprised of an inorganic dielectric layer, a magnetic material layer and an inorganic dielectric layer, and those having a magneto-optical recording layer provided thereon with a metal thin film of Al, Ti, etc.

Referring to the individual factors thereof, the substrate may include transparent substrates made of glass, polycarbonate resin, acrylic resin or the like. The inorganic dielectric film may include films formed of ZnS, $SiO_2$, AlN, $Si_3N_4$, $Al_2O_3$, $In_2O_3$ or the like. The magnetic material layer may typically include magnetic films formed of an alloy of a rare earth element and a transition metal element, such as Tb—Fe—Co, Tb—Fe—Gd, Nd—Fe—Co or Nd—Dy—Fe—Co. These inorganic dielectric layer, magnetic material layer and metal thin film and so forth are formed by a physical film forming process such as sputtering.

As described above, the present invention makes it possible to prevent electrostatic attraction between the magnetic head and the protective layer and to obtain a magneto-optical recording medium that may cause less deterioration of recording-reproducing performance.

The present invention also makes it possible to impart the stated conductivity to the protective layer without causing a decrease in strength of the protective resin layer, because of the conductive particles having an aspect ratio of 5 or more, added to the protective resin layer.

The present invention still also makes it possible to decrease electrical resistance of the surface without increasing the thermal conductivity of the protective resin layer, because of the use of the organic conductive compound in the protective layer, and hence to form the protective resin layer into a single layer and simplify the process of producing a high-quality magneto-optical recording medium.

In the present invention, the surface resistivity of the protective resin layer is measured according to what is prescribed in JIS-K-6911, 5, 13. A surface electrode is placed on a test piece, and a direct current of from 100 V to 1,000 V is applied thereto to measure resistance after charging for 1 minute, using an ultrainsulation gauge.

Surface resistivity $\rho_s=\pi(D+d)D-d\times R_s$ wherein;

D: Inner diameter of a circular electrode on the surface.
d: Outer diameter of the circular electrode on the surface.
$R_S$: Surface resistivity (MΩ).

The thermal conductivity of the protective resin layer is measured according to what is prescribed in JIS-A-1412. A sample is put in a sample container having a built-in heater, and a direct current with an ampere I and a voltage V is applied for t seconds to measure a temperature rise (σT) of the sample at that time. Next, the calorie (C) is calculated according to the following expression (1).

$$C=(I\cdot V\cdot t)/\sigma T \quad (1)$$

Subsequently, the thermal conductivity (λ) is calculated according to the following expression (2).

$$\lambda=(C\cdot \sigma T)/A\cdot (dt/dl) \quad (2)$$

wherein A is a cross-sectional area of the sample, and dt/dl is a temperature gradient.

EXAMPLES

The present invention will be described below in greater detail by giving Examples.

Example 101

First, a urethane-acrylate type ultraviolet curable resin composition having the following composition was prepared.

| | |
|---|---|
| Urethane-acrylate oligomer | 18% by weight |
| Dicyclopentadiene diacrylate | 65% by weight |
| Trimethylolpropane triacrylate | 12% by weight |
| Photopolymerization initiator (trade name: IRGACURE 184; available from Ciba-Geigy (Japan) Limited) | 5% by weight |

Next, in the above resin composition, 20% by weight of $SnO_2$ particles with an average particle diameter of 0.5 μm was dispersed. Thereafter, the resulting resin composition was applied on a first support film as shown in FIG. 4A, followed by irradiation using a UV lamp (233 mW/cm$^2$ on the irradiation surface; wavelength: 365 nm) for 7 seconds to form a first protective layer with a thickness of 6 μm.

Then, a rubber type pressure-sensitive adhesive with a thermal conductivity of 0.2 W/m·K, comprised of 100 parts by weight of a polystyrene-polybutadiene block copolymer (trade name: CALIFLEX TR1107; available from Shell Chemical Co.), 50 parts by weight of modified wood rosin and 1 part by weight of a stabilizer, was applied in a thickness of 2 μm on a second support film as shown in FIG. 4B, to form a second protective layer. Subsequently, as shown in FIG. 4C, the first and second support films were laminated in the manner that the first protective layer and the second protective layer stood face-to-face. Thus a protective pressure-sensitive adhesive sheet was produced.

Meanwhile, on a polycarbonate disk substrate (diameter: 86 mm; thickness 1.2 mm) on which pregrooves and prepits had been formed, a magneto-optical recording layer comprised of an SiN film of 1,000 Å thick, an amorphous Tb—Fe—Co—Cr magnetic material layer of 200 Å thick and an SiN film of 400 Å thick was formed and an Al—Cr film of 600 Å thick was also formed thereon, by sputtering.

Next, as shown in FIGS. 5A to 5C, the second support film of the protective pressure-sensitive adhesive sheet was peeled from the first protective layer, and then laminated to the Al—Cr film previously formed, in the manner that the Al—Cr film and the first protective layer stood face-to-face, followed by pressing. Thereafter, the first support film was peeled. Thus a magneto-optical disk provided with a protective resin layer comprised of the first protective layer and the second protective layer was produced.

Example 102

A magneto-optical disk was produced in the same manner as in Example 101 except that the content of $SnO_2$ in the second protective layer used therein was changed to 25% by weight.

Comparative Example 101

First, an acrylate type ultraviolet curable resin composition having the following composition was prepared.

| | |
|---|---|
| Urethane-acrylate oligomer | 18% by weight |
| Dicyclopentadiene diacrylate | 65% by weight |
| Trimethylolpropane triacrylate | 12% by weight |
| Photopolymerization initiator (trade name: IRGACURE 184; available from Ciba-Geigy (Japan) Limited) | 5% by weight |

Next, in the above ultraviolet curable resin composition, 50% by weight of Sb-coated $TiO_2$ particles with an average particle diameter of 1.5 µm was dispersed.

In the same manner as in Example 101, the magneto-optical recording layer and the Al—Cr film were also successively laminated to the optical disk substrate.

Figure 6:
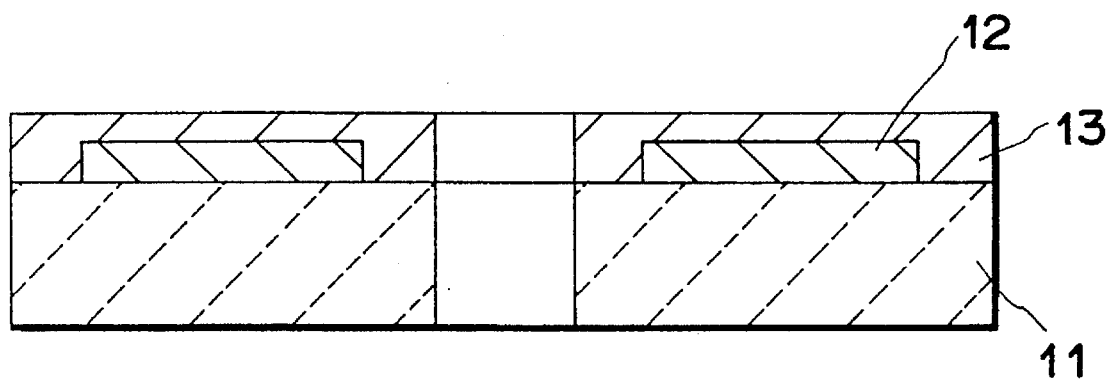
FIG. 6 is a diametrical cross section of an embodiment of the magneto-optical disk according to the present invention.

Next, as shown in FIG. 6, the above ultraviolet curable resin composition was applied on the substrate by spin coating so as to cover the Al—Cr thin film and the magneto-optical recording layer to form a resin layer with a layer thickness of 8 µm, followed by irradiation using a UV lamp (233 mW/cm$^2$ on the irradiation surface; wavelength: 365 nm) for 7 seconds to cure the resin to form a protective resin layer. Thus a magneto-optical disk was obtained.

Comparative Example 102

A magneto-optical disk was produced in the 10 same manner as in Comparative Example 101 except that the content of conductive $TiO_2$ particles used therein was changed to 40% by weight, and the layer thickness to 6 µm.

Comparative Example 103

A magneto-optical disk was produced in the same manner as in Example 101 except that the $SnO_2$ in the second protective layer used therein was replaced with $TiO_2$ particles which have an average particle diameter of 1.5 µm and whose surfaces had been coated with Sb, and its content was changed to 10% by weight.

Comparative Example 104

A magneto-optical disk was produced in the same manner as in Comparative Example 101 except that 20% by weight of $SnO_2$ was used as the conductive particles.

On the magneto-optical disks thus obtained, physical properties were measured or evaluated for the following (1) to (5).

Results obtained are shown in Table 101.

(1) Surface resistivity of the second protective layer of the magneto-optical disk.
(2) Electrostatic voltage of the second protective layer of the magneto-optical disk.
(3) Recording-reproducing performance (noise level and C/N ratio).
(4) Head crash test in an environment of low humidity.
(5) Mechanical shape characteristics of disks before and after left in an environment of high temperature and high humidity.

The above (1) to (5) were measured and evaluated in the following way.

(1) Surface resistivity of the second protective layer of the magneto-optical disk Measured according to JIS-K-6911 previously described, at an applied voltage of 100 to 1,000 V using an ultrainsulation gauge (trade name: SM-8205; manufactured by Toa Denpa Kogyo K.K.) and a surface resistivity measuring electrode.

(2) Electrostatic voltage of the second protective layer of the magneto-optical disk The magneto-optical disks produced in Examples or Comparative Examples were each set on a magneto-optical disk recording-reproducing apparatus provided with a floating magnetic head. The disk was rotated at 3,000 rpm and the magnetic head was floated (float: 1.6 µm) for 10 seconds over the protective resin layer as shown in FIG. 1. After that, the electrostatic voltage on the surface of the protective resin layer was measured using an electrostatic voltmeter (trade name: STATIRON M-1000; manufactured by Shindo Denki K.K.)

(3) Recording-reproducing performance

Each magneto-optical disk was set on a magneto-optical disk recording-reproducing inspection device (trade name: LN52A; manufactured by Shibasoku Co.) provided with a floating magnetic head on the side of the protective resin layer as shown in FIG. 1, to record information and reproduce the recorded information, and recording noise of the magneto-optical disk was measured. Here, the recording and reproducing were performed under the following conditions.

Revolution number: 2,400 rpm

Magnetic field intensity: 200 Oe

Frequency: 6 MHz

Recording power: 10 mW

Reproducing power: 1.0 mW

Recording-reproducing light wavelength: 830 nm (4) Head crash test

Using a magneto-optical recording-reproducing apparatus (manufactured by Canon Inc.) in which the space between the magnetic head slider and the protective layer was so adjusted to be 1.6 µm when a medium was rotated at 3,000 rpm in a low-humidity environment of 30° C. and 30%RH, the magneto-optical disks of Examples and Comparative Examples were each rotated at 3,000 rpm for 3 seconds and then stopped for 3 seconds. A CSS test of repeating a series of such operation was carried out 100,000 times to examine whether or not the electrostatic attraction of the head to the protective resin layer occurred.

(5) Mechanical shape characteristics (tilt angle)

Immediately after each magneto-optical disk was produced and after left in a high-temperature and high-humidity environment of 80° C and 90% RH for 2,000 hours, the warpage (tilt angle) of the disk was measured using a tilt angle measuring device (trade name: LM-100; manufactured by Ono Sokuki K.K.).

TABLE 101

| | Thermal conductivity | | | | Recording-reproducing performance | | | Mechanical characteristics (tilt) | |
|---|---|---|---|---|---|---|---|---|---|
| | Second protective layer (W/m · K) | First protective layer | Surface resistivity (Ω/square) | Electro-static voltage (kV) | Noise level (dBm) | C/N ratio (dB) | Head crash test | Initial value (mrad) | After running (mrad) |
| Example: | | | | | | | | | |
| 101 | 15 | 0.2 | $8.0 \times 10^9$ | 0.2 | −60 | 49.8 | None | 0.31 | 0.32 |
| 102 | 16 | 0.2 | $9.1 \times 10^9$ | 0.3 | −61 | 49.9 | None | 0.32 | 0.33 |
| Comparative Example: | | | | | | | | | |
| 101 | 23 | — | $9.0 \times 10^8$ | 0.1 | −43 | 34.0 | None (*1) | 1.13 | 4.15 |
| 102 | 15 | — | $9.2 \times 10^8$ | 0.1 | −45 | 33.8 | None (*1) | 1.12 | 4.13 |
| 103 | 8 | 0.2 | $1.0 \times 10^{11}$ | 0.7 | −60 | 49.8 | Occur | 0.33 | 0.34 |
| 104 | 17 | — | $8.0 \times 10^9$ | 0.2 | −45 | 33.8 | None | 1.12 | 4.15 |

(*1): Scratches occured on the surface of the protective resin layer)

Example 201

Three kinds of magneto-optical disks of Example 201(a) to (c) were produced in the same manner as in Example 101 except that the conductive particles used therein were replaced with $TiO_2$ particles which have an aspect ratio of 5 and an average length (in longitudinal direction) of 1.5 μm and whose surfaces had been coated with antimony, the $TiO_2$ particles being added in an amount of (a) 10 parts by weight, (b) 20 parts by weight or (c) 30 parts by weight, based on the ultraviolet curable resin composition.

Examples 202 to 208

Magneto-optical disks were produced in the same manner as in Example 201 except that the conductive particles used therein in the second protective layer were changed as shown in Table 201 below.

TABLE 201

| Example No. | Protective layer | | |
|---|---|---|---|
| | Particles added | Aspect ratio | Amount* |
| 202 (a) | Sb-coated $TiO_2$ | 10 | 10 |
| 202 (b) | Sb-coated $TiO_2$ | 10 | 20 |
| 202 (c) | Sb-coated $TiO_2$ | 10 | 30 |
| 203 (a) | Sb-coated $TiO_2$ | 15 | 10 |
| 203 (b) | Sb-coated $TiO_2$ | 15 | 20 |
| 203 (c) | Sb-coated $TiO_2$ | 15 | 30 |
| 204 (a) | Sb-coated $ZnO_2$ | 5 | 10 |
| 204 (b) | Sb-coated $ZnO_2$ | 5 | 20 |
| 204 (c) | Sb-coated $ZnO_2$ | 5 | 30 |
| 205 (b) | Sb-coated $ZnO_2$ | 10 | 20 |
| 205 (c) | Sb-coated $ZnO_2$ | 10 | 30 |
| 206 (a) | Sb-coated $ZnO_2$ | 15 | 10 |
| 206 (b) | Sb-coated $ZnO_2$ | 15 | 20 |
| 206 (c) | Sb-coated $ZnO_2$ | 15 | 30 |
| 207 (a) | Sb-coated potassium titanate | 15 | 10 |
| 207 (b) | Sb-coated potassium titanate | 15 | 20 |
| 207 (c) | Sb-coated potassium titanate | 15 | 30 |
| 208 (a) | Sb-coated $TiO_2$ | 1 | 50 |

*parts by weight; amount based on 100 parts by weight of the resin

Example 209

To a disk substrate, a magneto-optical recording layer and an Al—Cr film were successively laminated in entirely the same manner as in Example 101.

Subsequently, the same ultraviolet curable resin composition as prepared in Example 101 was applied on the Al—Cr film by spin coating, followed by irradiation using a UV lamp (233 mW/cm² on the irradiation surface; wavelength: 365 nm) for 7 seconds to cure the resin to form a first protective layer with a thickness of 6 μm and a thermal conductivity of 0.1 to 0.3 mW.

Next, to the ultraviolet curable resin composition used for forming the first protective layer, Sb-coated $TiO_2$ particles (aspect ratio: 15; average length (in longitudinal direction): 2 μm) were added in an amount of (a) 10 parts by weight, (2) 20 parts by weight or (c) 30 parts by weight, and the resulting composition was applied on the first protective layer by spin coating, followed by irradiation using a UV lamp to cure the resin to form a second protective layer with a thickness of 8 μm. Thus, three kinds of magneto-optical disks of Examples 208(a) to 208(c) were obtained.

Comparative Example 201

A magneto-optical disk was produced in the same manner as in Example 209 except that the second protective layer formed therein was not formed.

On the magneto-optical disks of Examples 201 to 209 and Comparative Example 201, evaluation was made in the same manner as in Example 101.

Results obtained are shown in Table 202.

TABLE 202

| | Thermal conductivity | | | Recording-reproducing performance | | | Mechanical characteristics (tilt) | |
|---|---|---|---|---|---|---|---|---|
| | Second protective layer (W/m·K) | First protective layer (W/m·K) | Surface resistivity (Ω/square) | Electrostatic voltage (kV) | Noise level (dBm) | C/N ratio (dB) | Head crash test | Initial value (mrad) | After running (mrad) |
| Example: | | | | | | | | |
| 201(a) | 3 | 0.2 | $6.5 \times 10^9$ | 0.3 | −60 | 50.2 | None | 0.31 | 0.32 |
| 201(b) | 6 | 0.2 | $5.0 \times 10^9$ | 0.2 | −61 | 49.9 | None | 0.31 | 0.32 |
| 201(c) | 8 | 0.2 | $2.5 \times 10^9$ | 0.2 | −60 | 49.8 | None | 0.32 | 0.34 |
| 202(a) | 3 | 0.2 | $9.5 \times 10^9$ | 0.6 | −60 | 50.1 | None | 0.33 | 0.34 |
| 202(b) | 6 | 0.2 | $8.0 \times 10^9$ | 0.5 | −60 | 49.8 | None | 0.32 | 0.33 |
| 202(c) | 8 | 0.2 | $6.5 \times 10^9$ | 0.4 | −60 | 49.9 | None | 0.33 | 0.35 |
| 203(a) | 3 | 0.2 | $4.0 \times 10^9$ | 0.2 | −61 | 50.1 | None | 0.30 | 0.31 |
| 203(b) | 6 | 0.2 | $3.0 \times 10^9$ | 0.2 | −60 | 49.8 | None | 0.30 | 0.31 |
| 203(c) | 8 | 0.2 | $9.5 \times 10^9$ | 0.1 | −60 | 49.9 | None | 0.31 | 0.32 |
| 204(a) | 3.5 | 0.2 | $9.0 \times 10^9$ | 0.6 | −60 | 49.8 | None | 0.33 | 0.34 |
| 204(b) | 5.5 | 0.2 | $7.0 \times 10^9$ | 0.4 | −60 | 49.9 | None | 0.34 | 0.36 |
| 204(c) | 9.0 | 0.2 | $4.5 \times 10^9$ | 0.2 | −61 | 50.1 | None | 0.34 | 0.35 |
| 205(a) | 3.5 | 0.2 | $1.0 \times 10^{10}$ | 0.8 | −61 | 49.8 | None | 0.34 | 0.35 |
| 205(b) | 5.5 | 0.2 | $9.5 \times 10^9$ | 0.6 | −61 | 49.9 | None | 0.34 | 0.35 |
| 205(c) | 9 | 0.2 | $8.0 \times 10^9$ | 0.5 | −60 | 50.1 | None | 0.34 | 0.36 |
| 206(a) | 3.5 | 0.2 | $6.5 \times 10^9$ | 0.3 | −61 | 49.8 | None | 0.33 | 0.34 |
| 206(b) | 5.5 | 0.2 | $5.0 \times 10^9$ | 0.2 | −61 | 49.9 | None | 0.32 | 0.34 |
| 206(c) | 9.0 | 0.2 | $1.5 \times 10^9$ | 0.1 | −60 | 49.8 | None | 0.33 | 0.35 |
| 207(a) | 3.3 | 0.2 | $5.0 \times 10^9$ | 0.2 | −61 | 50.1 | None | 0.32 | 0.33 |
| 207(b) | 6.1 | 0.2 | $2.5 \times 10^9$ | 0.2 | −60 | 49.9 | None | 0.33 | 0.35 |
| 207(c) | 8.2 | 0.2 | $9.0 \times 10^8$ | 0.1 | −61 | 49.8 | None | 0.31 | 0.33 |
| 208 | 12 | 0.2 | $9.0 \times 10^9$ | 0.1 | −60 | 49.8 | None (*3) | 0.31 | 0.33 |
| 209(a) | 3 | 0.15 | $5.0 \times 10^9$ | 0.2 | −60 | 49.8 | None | 1.30 | 6.18 |
| 209(b) | 6 | 0.15 | $3.5 \times 10^9$ | 0.2 | −61 | 49.9 | None | 1.32 | 6.32 |
| 209(c) | 8 | 0.15 | $9.0 \times 10^8$ | 0.1 | −60 | 49.9 | None | 1.31 | 6.25 |
| Comparative Example: | | | | | | | | |
| 201 | — | 0.15 | $2.0 \times 10^{13}$ | 1.0 | −61 | 49.9 | Occur | 1.12 | 4.13 |

(*3): Scratches occurred on the surface of the protective resin layer

As is seen from Table 202, the effect attributable to the second protective layer containing conductive particles having an aspect ratio of 5 or more is clear from the following.

For example, in Examples 201, 202 and 203 in which Sb-coated $TiO_2$ was used as the conductive particles, the second protective layer has a surface resistivity maintained at $1 \times 10^{10}$ Ω/square of less even when it contains the Sb-coated $TiO_2$ in an amount of 10 parts by weight (about 9% by weight) based on 100 parts by weight of the resin. On the other hand, in the case of Comparative Example in which Sb-coated $TiO_2$ with an aspect ratio of 1 is used, the surface resistivity is $1.0 \times 10^{11}$ Ω/square to cause electrostatic attraction in the head crash test.

Example 301

First, an acrylate type ultraviolet curable resin composition having the following composition was prepared.

| | |
|---|---|
| Urethane-acrylate oligomer | 18% by weight |
| Dicyclopentadiene diacrylate | 65% by weight |
| Trimethylolpropane triacrylate | 12% by weight |
| Photopolymerization initiator (trade name: IRGACURE 184; available from Ciba-Geigy (Japan) Limited) | 5% by weight |

Next, in the above ultraviolet curable resin composition, 5% by weight of a charge transfer complex of the following structural formula (V) was dispersed to produce an ultraviolet curable resin composition for the formation of the protective resin layer so as to have a thermal conductivity of 0.1 to 0.3 W/m·K.

In the same manner as in Example 101, the magneto-optical recording layer and the Al—Cr film were also successively laminated to the optical disk substrate.

Next, as shown in FIG. 6, the above ultraviolet curable resin composition was applied on the substrate by spin coating so as to cover the Al—Cr thin film and the magneto-optical recording layer to form a resin layer with a layer thickness of 4 μm, followed by irradiation using a UV lamp (233 mW/cm² on the irradiation surface; wavelength: 365 nm) for 7 seconds to cure the resin to form a protective resin layer. Thus a magneto-optical disk was obtained.

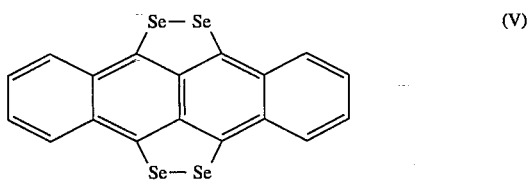

(V)

Example 302

A magneto-optical disk was produced in the same manner as in Example 301 except that the charge transfer complex was replaced with a compound of the following structural formula (VI) and the resin layer was formed in a layer thickness of 6 μm.

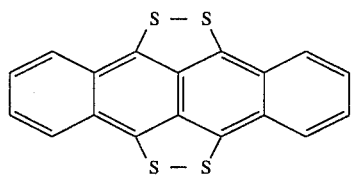 (VI)

Example 303

On a polycarbonate disk substrate (diameter: 9 cm; thickness 1.2 mm) on which pregrooves and prepits had been formed, a magneto-optical recording layer comprised of an SiN film of 1,000 Å thick, an amorphous Tb—Fe—Co—Cr magnetic material layer of 200 Å thick and an SiN film of 400 Å thick was formed and an Al—Cr film of 600 Å thick was also formed thereon, by sputtering.

As for the protective resin layer, it was formed in the following way. First, pyrrole as an electrolyte was dissolved in nitrobenzene containing 0.1 mol of $(n\text{-Bu})_4NBF_4$. Then, in the resulting solution, a pair of platinum electrodes were immersed, and electrolytic polymerization was carried out under conditions of a current density of 10 mA/cm$^2$ and a voltage of 4 V to form a polypyrrole film having a thermal conductivity of 0.6 to 0.7 W/m·K and a thickness of 4 μm.

Next, the above polypyrrole film was bonded onto the magneto-optical recording layer previously formed, interposing an adhesive layer, to produce a magneto-optical recording medium.

As an adhesive therefor, two-part curable acrylic pressure-sensitive adhesive (trade name: ORIBAIN BPS4089-5; available from Toyo Ink Mfg. Co., Ltd.) was used, and the adhesive layer was formed in a thickness of 2 μm. The adhesive had a thermal conductivity of 0.15 W/m·K.

Example 304

A magneto-optical disk was produced in the same manner as in Example 303 except that the polypyrrole film used therein as the protective resin layer was replaced with a polythiophene film of 6 μm thick.

Example 305

A magneto-optical disk was produced in the same manner as in Example 303 except that the polypyrrole film used therein as the protective resin layer was replaced with a film (trade name SEC Film; available from Ciba-Geigy (Japan) Limited) comprised of a compound material of polypyrrole with a phenoxy resin type polyanion, having a thickness of 6 μm and the polypyrrole in a content of 14% by weight.

Example 306

A magneto-optical disk was produced in the same manner as in Example 303 except that the polypyrrole film used therein as the protective resin layer was replaced with a film (trade name SEC Film; available from Ciba-Geigy (Japan) Limited) comprised of a compound material of polypyrrole with a phenoxy resin type polyanion, having a thickness of 6 μm and the polypyrrole in a content of 18% by weight.

Example 307

A magneto-optical disk was produced in the same manner as in Example 303 except that the protective resin layer used therein was replaced with a film of 6 μm thick comprising polycarbonate resin and dispersed therein 1% by weight of the charge transfer complex represented by formula (V) previously set out.

Example 308

A magneto-optical disk was produced in the same manner as in Example 303 except that the protective resin layer used therein was replaced with a film of 4 μm thick comprising polycarbonate resin and dispersed therein 1.5% by weight of the charge transfer complex represented by formula (VI) previously set out.

On the magneto-optical disks of Examples 301 to 308, evaluation was made in the same manner as in Example 101.

Results obtained are shown in Table 301.

TABLE 301

| | Thermal conductivity | | | | Recording-reproducing performance | | | Mechanical characteristics (tilt) | |
|---|---|---|---|---|---|---|---|---|---|
| Example: | Protective resin layer (W/m · K) | Adhesive layer | Surface resistivity (Ω/square) | Electro-static voltage (kV) | Noise level (dBm) | C/N ratio (dB) | Head crash test | Initial value (mrad) | After running (mrad) |
| 301 | 0.1–0.3 | — | $5.5 \times 10^8$ | <0.1 | −60 | 49.8 | None | 1.11 | 4.15 |
| 302 | 0.1–0.3 | — | $5.1 \times 10^8$ | <0.1 | −61 | 49.9 | None | 1.12 | 4.16 |
| 303 | 0.6–0.7 | 0.15 | $3.5 \times 10^8$ | <0.1 | −60 | 49.6 | None | 0.31 | 0.33 |
| 304 | 0.6–0.7 | 0.15 | $4.1 \times 10^8$ | <0.1 | −61 | 49.9 | None | 0.32 | 0.33 |
| 305 | 0.2–0.3 | 0.15 | $4.8 \times 10^8$ | <0.1 | −60 | 49.7 | None | 0.34 | 0.35 |
| 306 | 0.2–0.3 | 0.15 | $4.1 \times 10^8$ | <0.1 | −61 | 49.7 | None | 0.33 | 0.34 |
| 307 | 0.1–0.3 | 0.15 | $4.8 \times 10^8$ | <0.1 | −60 | 49.6 | None | 0.31 | 0.32 |
| 308 | 0.1–0.3 | 0.15 | $6.5 \times 10^8$ | <0.1 | −60 | 49.6 | None | 0.31 | 0.32 |

Example 401

A magneto-optical disk was produced in the same manner as in Example 101 except that, in the urethane-acrylate ultraviolet curable resin composition used therein to form the second protective layer, silicone oligomer (trade name:

AK-5; available from Toagosei Chemical Industry Co., Ltd.) was blended in an amount of 10% by weight based on the weight of the resin composition and a cured product thereof was formed as the second protective layer.

Figure 7:
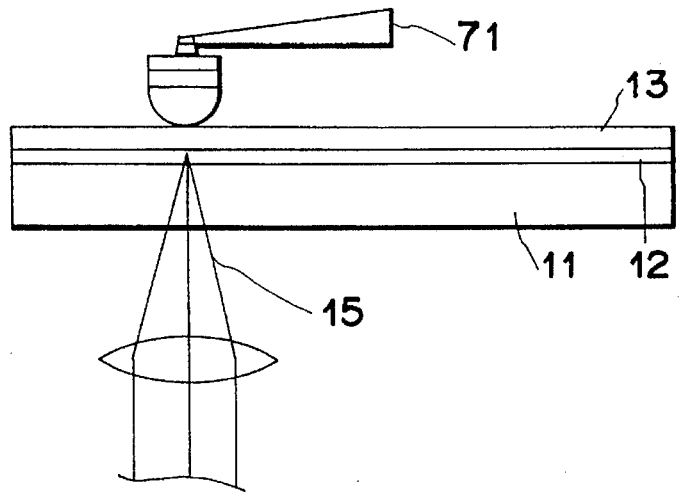
FIG. 7 is a schematic illustration of the manner by which information is recorded in a magneto-optical disk by using a sliding magnetic head.
Figure 8:
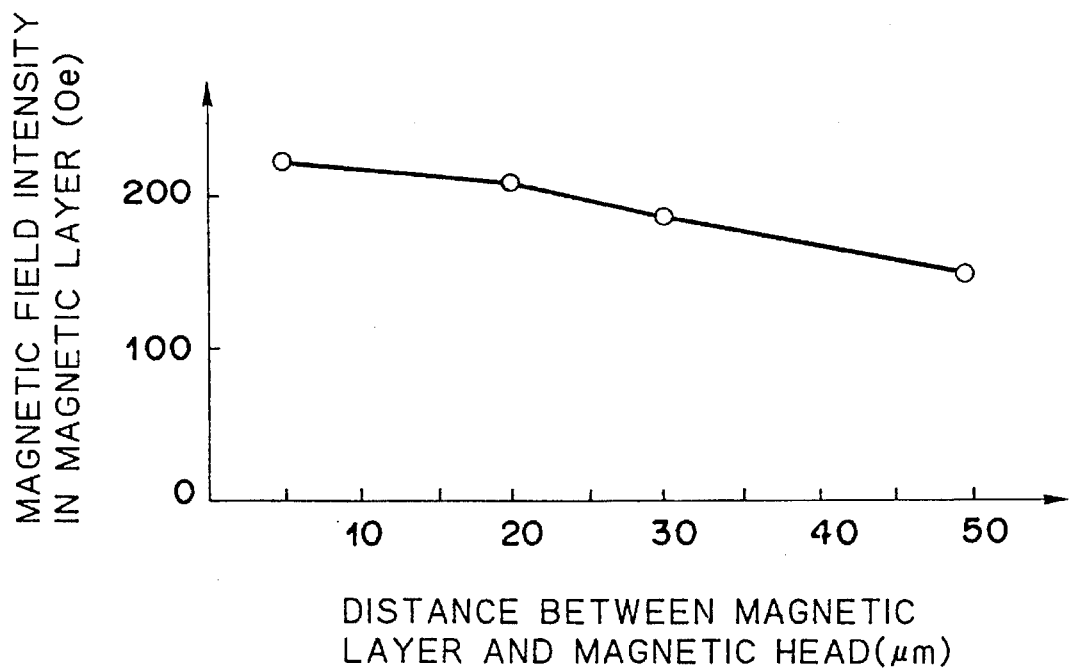
FIG. 8 shows the relationship between the distance between a magnetic layer and a magnetic head, and the magnetic field intensity in the magnetic layer.

The magneto-optical disk thus obtained was set on a magneto-optical disk recording-reproducing apparatus provided with a sliding magnetic head as shown in FIG. 7, to record information and reproduce the recorded information under the following conditions.

Revolution number: 800 rpm
Magnetic field intensity: 150 Oe
Frequency: 6 MHz
Recording-reproducing beam wavelength: 830 nm
Recording beam intensity: 5 mW
Reproducing beam intensity: 1 mW As a result, it was possible to ensure a C/N ratio of 47 dB.

Example 402

On a 4 μm thick fluorinated acrylate resin sheet (trade name: KAYARAD INC20631F; available from Nippon Kayaku Co., Ltd.), incorporated with 20% by weight of $SnO_2$ as conductive particles, the pressure-sensitive adhesive as used in Example 101 was applied in a thickness of 2 μm to produce a protective pressure-sensitive adhesive sheet. This sheet was contact-bonded onto the Al—Cr film formed on a substrate in the same manner as in Example 101. A magneto-optical disk was thus produced.

Example 403

On a 6 μm thick silicone acrylate resin sheet (trade name: SPC-112S; available from Nippon Kayaku Co., Ltd.), incorporated with 20% by weight of $SnO_2$ as conductive particles, the pressure-sensitive adhesive as used in Example 101 was applied in a thickness of 2 μm to produce a protective pressure-sensitive adhesive sheet. This sheet was contact-bonded onto the Al—Cr film formed on a substrate in the same manner as in Example 101. A magneto-optical disk was thus produced.

Example 404

A magneto-optical disk was produced in the same manner as in Example 101 except that, in the resin composition used therein to form the second protective layer, a fluorine type wetting agent (trade name: FOMBRIN Z-25; available from Montebideo K.K.) was blended in an amount of 5% by weight.

On the magneto-optical disks of Examples 402 to 404 thus obtained, recording and reproduction using the sliding magnetic head was carried out in the same manner as in Example 401. As a result, C/N ratios obtained were within the values of 47 to 49 dB.

Example 501

On the first surface of a polyethylene terephthalate film of 2 μm thick, polyvinylidene chloride (trade name: KF-25; available from Kureha Chemical Industry Co., Ltd.) was coated in a thickness of 2 μm, and further thereon the ultraviolet curable resin composition containing $SnO_2$ as prepared in Example 101 was applied in a thickness of 2 μm, followed by curing. Then, on the second surface of this film, the pressure-sensitive adhesive as used in Example 101 was coated in a thickness of 2 μm to produce a protective pressure-sensitive adhesive sheet. This sheet was contact-bonded onto the Al—Cr film formed on a disk substrate in the same manner as in Example 101. A magneto-optical disk was thus produced.

Example 502

On the first surface of a polyethylene terephthalate film of 2 μm thick, a vinyl chloride/vinylidene chloride copolymer (trade name: KF-25; available from Kureha Chemical Industry Co., Ltd.) was applied in a thickness of 2 μm, and further thereon the ultraviolet curable resin composition containing $SnO_2$ as prepared in Example 101 was applied in a thickness of 2 μm, followed by curing. Then, on the second surface of this film, the pressure-sensitive adhesive as used in Example 101 was applied in a thickness of 2 μm to produce a protective pressure-sensitive adhesive sheet. This sheet was contact-bonded onto the Al—Cr film in the same manner as in Example 501. A magneto-optical disk was thus produced.

Example 503

A film of 2 μm thick was prepared using the ultraviolet curable resin composition as prepared in Example 101. Subsequently, on the first surface of this film, a vinyl chloride/vinylidene chloride copolymer was applied in a thickness of 4 μm, and further thereon the ultraviolet curable resin composition containing $SnO_2$ as prepared in Example 101 was applied in a thickness of 2 μm, followed by curing. Then, on the second surface of this film, the pressure-sensitive adhesive as used in Example 101 was applied in a thickness of 2 μm to produce a protective pressure-sensitive adhesive sheet. This sheet was contact-bonded onto the Al—Cr film in the same manner as in Example 501. A magneto-optical disk was thus produced.

Example 504

A protective pressure-sensitive adhesive sheet was produced in the same manner as in Example 503 except that the vinyl chloride/vinylidene chloride copolymer was replaced with polyvinylidene chloride, and using this sheet a magneto-optical disk was similarly produced.

Example 505

On the first surface of a polyvinylidene chloride film of 2 μm thick, the ultraviolet curable resin composition as prepared in Example 101 was applied in a thickness of 2 μm, followed by curing. On the second surface of the film, the ultraviolet curable resin composition containing $SnO_2$ as prepared in Example 101 was applied in a thickness of 2 μm, followed by curing. On the cured film of the ultraviolet curable resin, formed on the first surface of that film, the pressure-sensitive adhesive as used in Example 101 was further applied in a thickness of 2 μm to produce a protective pressure-sensitive adhesive sheet. This sheet was contact-bonded onto the Al—C4 film in the same manner as in Example 501. A magneto-optical disk was thus produced.

Example 506

A protective pressure-sensitive adhesive sheet was produced in the same manner as in Example 504 except that the polyvinylidene chloride was replaced with a vinyl chloride/vinylidene chloride copolymer.

On the magneto-optical disks produced in Examples 501 to 506, changes with time of bite error rate (B.E.R.) after the disks had been left standing for 2,000 hours in an environment of 80° C. and 90% RH were observed.

Results obtained are shown in Table 501.

The B.E.R. was measured using a magneto-optical disk recording-reproducing inspection device (trade name: LM31A; manufactured by Shibasoku Co.). It was measured under the conditions of a recording laser power of 6 mW at an innermost radius r of 24, a recording laser power of 8 mW at an outermost radius r of 40, an erasing power of 8 mW, a reproducing power of 1 mW and an erasing-recording magnetic field of 300 Oe.

TABLE 501

|  | B.E.R. | |
| --- | --- | --- |
|  | Initial value | After 2,000 hours |
| Example 501 | $1.1 \times 10^{-6}$ | $1.1 \times 10^{-6}$ |
| Example 502 | $1.2 \times 10^{-6}$ | $1.2 \times 10^{-6}$ |
| Example 503 | $1.1 \times 10^{-6}$ | $1.1 \times 10^{-6}$ |
| Example 504 | $1.0 \times 10^{-6}$ | $1.0 \times 10^{-6}$ |
| Example 505 | $1.0 \times 10^{-6}$ | $1.0 \times 10^{-6}$ |
| Example 506 | $1.1 \times 10^{-6}$ | $1.1 \times 10^{-6}$ |

What is claimed is:

1. A magneto-optical recording medium, comprising:
a substrate;
a magneto-optical recording layer provided on said substrate; and
a protective resin layer provided on said magneto-optical recording layer, said recording medium being adapted to have information recorded thereon by a magnetic field being applied to said recording layer from the side of said protective layer by a magnetic-field generating means, while said recording layer is irradiated with a light beam from the opposite side, through said substrate,
wherein said protective layer has a first surface adapted to confront the magnetic-field generating means during said recording operation and a second surface that confronts said recording layer, and said protective layer has a surface resistivity of $1 \times 10^3 - 1 \times 10^{10}$ $\Omega/\square$ on the first surface and has a thermal conductivity of 0.1–10 W/m·K in a region extending from the second surface toward the first surface.

2. The magneto-optical recording medium according to claim 1, wherein said protective layer has a laminated structure comprised of at least two sublayers.

3. The magneto-optical recording medium according to claim 1, wherein said protective layer contains a conductive polymeric compound.

4. The magneto-optical recording medium according to claim 1, wherein said protective layer contains a charge transfer complex.

5. The magneto-optical recording medium according to claim 1, wherein said protective layer has a thickness of from 3 µm to 15 µm.

6. The magneto-optical recording medium according to claim 1, wherein said protective layer contains acicular or flaky conductive particles having an aspect ratio of 5 of more.

7. The magneto-optical recording medium according to claim 1, wherein said region extending from the second surface toward the first surface and having a thermal conductivity of 0.1–10 W/m·K in said protective layer has a thickness of at least 0.5 µm.

8. The magneto-optical recording medium according to claim 1, wherein said protective layer has a laminated structure comprising at least two sublayers, and the sublayer of said laminated protective layer that is nearest to the first surface of the protective layer is formed of a material having a thermal conductivity of 0.1–10 W/m·K.

9. The magneto-optical recording medium according to claim 2, wherein said protective layer contains conductive particles in the sublayer that is disposed nearest to the first surface of the protective layer.

10. The magneto-optical recording medium according to claim 3, wherein said conductive polymeric compound is a composite comprised of a conjugated conductive polymeric compound and a polyanion.

11. The magneto-optical recording medium according to claim 4, wherein said charge transfer complex is a tetracane derivative.

12. The magneto-optical recording medium according to claim 9, wherein said conductive particles are conductive ceramic particles.

13. The magneto-optical recording medium according to claim 12, wherein said conductive ceramic particles are acicular or flaky particles having an aspect ratio of 5 or more.

14. The magneto-optical recording medium according to claim 13, wherein said acicular conductive ceramic particles are antimony-modified potassium titanate particles.

15. A magneto-optical recording medium comprising:
a substrate;
a magneto-optical recording layer provided on said substrate; and
a protective resin layer provided on said magneto-optical recording layer, said recording medium being adapted to have information recorded thereon by a magnetic field being applied to said recording layer from the side of said protective layer by a magnetic-field generating means, while said recording layer is irradiated with a light beam from the opposite side, through said substrate,
wherein said protective resin layer has a laminated structure comprised of at least two sublayers,
a first sublayer of the laminated protective layer being the nearest sublayer to said magneto-optical recording layer and being formed of a material having a thermal conductivity of 0.1–10 W/m·K, and
a second sublayer of the laminated protective layer containing acicular or flaky conductive particles having an aspect ratio of 5 or more, thereby being so formed that said magneto-optical recording medium has a surface resistivity of $1 \times 10^3 - 1 \times 10^{10}$ $\Omega/\square$ on the surface thereof that is adapted to confront the magnetic-field generating means.

16. A magneto-optical recording medium comprising:
a substrate;
a magneto-optical recording layer provided on said substrate; and
a protective resin layer provided on said magneto-optical recording layer, said recording medium being adapted to have information recorded thereon by a magnetic field being applied to said recording layer from the side of said protective layer by a magnetic-field generating means, while said recording layer is irradiated with a light beam from the opposite side, through said substrate,
wherein said protective layer contains acicular or flaky conductive particles having an aspect ratio of 5 or more, thereby being so formed that said magneto-optical recording medium has a surface resistivity of $1 \times 10^3 - 1 \times 10^{10}$ $\Omega/\square$ on the surface thereof that is adapted to confront the magnetic-field generating means, and said protective layer includes a region with a thermal conductivity of 0.1–10 W/m·K.

17. A process for producing a magneto-optical recording medium comprising a substrate, a magneto-optical recording layer provided on the substrate, and a protective resin layer provided on the magneto-optical recording layer, said magneto-optical recording medium being adapted to have a magnetic field being applied to the recording layer from the side of the protective layer by a magnetic-field generating means, while the recording layer is irradiated with a light beam from the opposite side, through the substrate, said process comprising the step of bonding a resin sheet having a surface resistivity of $1 \times 10^3 - 1 \times 10^{10}$ Ω/☐ on at least one of its surfaces, onto the magneto-optical recording layer, with an adhesive layer having a thermal conductivity of 0.1–10 W/m·K being interposed therebetween, in such a manner that said surface is adapted to confront the magnetic-field generating means, thereby forming the protective resin layer on the magneto-optical recording layer.

18. The process for producing a magneto-optical recording medium according to claim 17, wherein the adhesive layer is formed in a thickness of 0.5 µm or more.

* * * * *

UNITED STATES PATENT AND TRADEMARK OFFICE
CERTIFICATE OF CORRECTION

PATENT NO. : 5,540,988
DATED : July 30, 1996
INVENTOR(S) : SHINICHI TACHIBANA, ET AL.

It is certified that error appears in the above-indentified patent and that said Letters Patent is hereby corrected as shown below:

Column 14,
  line 2, "left" should read --being left--; and
  line 56, "left" should read --being left--.

Column 15,
  TABLE 201, "204(c) Sb-coated $ZnO_2$  5 30" should read
     --204(c) Sb-coated $ZnO_2$  5 30
       205(a) Sb-coated $ZnO_2$ 10 10--.

Column 17,
  TABLE 202, In "203(b)", "-60" should read ---61--.

Column 20,
  line 37, "in" (second occurrence) should read
     --in Example 101.--.
  line 41, "Example 101." should be deleted.

Column 22,
  line 55, "Al-C4" should read --Al-Cr--.

Column 24,
  line 12, "tetracane" should read --tetracene--.

Signed and Sealed this

Eleventh Day of March, 1997

Attest:

BRUCE LEHMAN

Attesting Officer        Commissioner of Patents and Trademarks